Oct. 2, 1951     E. J. SCHLATTER     2,569,498
INSTRUMENT FOR DETERMINING SLOPE FROM STEREOSCOPIC IMAGES

Filed May 18, 1948     3 Sheets-Sheet 1

Inventor
E. J. SCHLATTER

By

ATTORNEYS

Oct. 2, 1951  E. J. SCHLATTER  2,569,498
INSTRUMENT FOR DETERMINING SLOPE FROM STEREOSCOPIC IMAGES
Filed May 18, 1948  3 Sheets-Sheet 2

Inventor
E. J. SCHLATTER
By
ATTORNEYS

Oct. 2, 1951 E. J. SCHLATTER 2,569,498
INSTRUMENT FOR DETERMINING SLOPE FROM STEREOSCOPIC IMAGES
Filed May 18, 1948 3 Sheets-Sheet 3

Inventor
E. J. SCHLATTER

By H. N. Foss

ATTORNEYS

Patented Oct. 2, 1951

2,569,498

UNITED STATES PATENT OFFICE 2,569,498

INSTRUMENT FOR DETERMINING SLOPE FROM STEREOSCOPIC IMAGES

Eugene J. Schlatter, Mount Rainier, Md.

Application May 18, 1948, Serial No. 27,813

3 Claims. (Cl. 33—1)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to an instrument for measuring land slopes, and has among its objects the production of an instrument which may be placed on a pair of overlap aerial photographs of the land, as for example those taken by airplane in the usual manner, and viewed through a stereoscope, so that the slope between the two selected points observed on the photographic stereoscopic image may be directly determined, thus to simplify the procedure usually required in making such a determination.

In general, according to the invention, the instrument is provided with a pair of flat sheets of transparent material, such as a clear plastic of the type commonly used for photographic negatives. Each sheet is inscribed with a set of circles of different radii and having their centers displaced along a line. The set of circles of one sheet is similar to that of the other. Means is provided for mounting the sheets coplanar, rotated 180° relative to each other, and adjustable toward and away from each other. The lines along which the centers of the circles are displaced are coincident in the mounting and they remain coincident during the adjustment. The arrangement is such that when the sheets are viewed through a stereoscope and proper adjustment made, the sets of circles give an image corresponding to a dome, the surface of which is made up of at least one conic surface, but preferably of a plurality of such surfaces, including conic frustums or cones, having different slopes with conic section circles calibrated to give the slope on the conic surfaces. Adjustment of the sheets toward and away from each other raises and lowers the dome image. Thus the instrument may be placed on a pair of overlap aerial photographs of the land and it and the photographs viewed simultaneously to give the photographic stereoscopic image and the dome image superimposed thereon. The instrument may then be moved and adjusted until selected points on the photographic stereoscopic image substantially lie on two of the circles along a line extending radially of the circles. The slope between the selected points is then determined by reference to the calibration for the circles.

For a detail description of the invention, reference is made to the accompanying drawing, in which—

Figure 1:
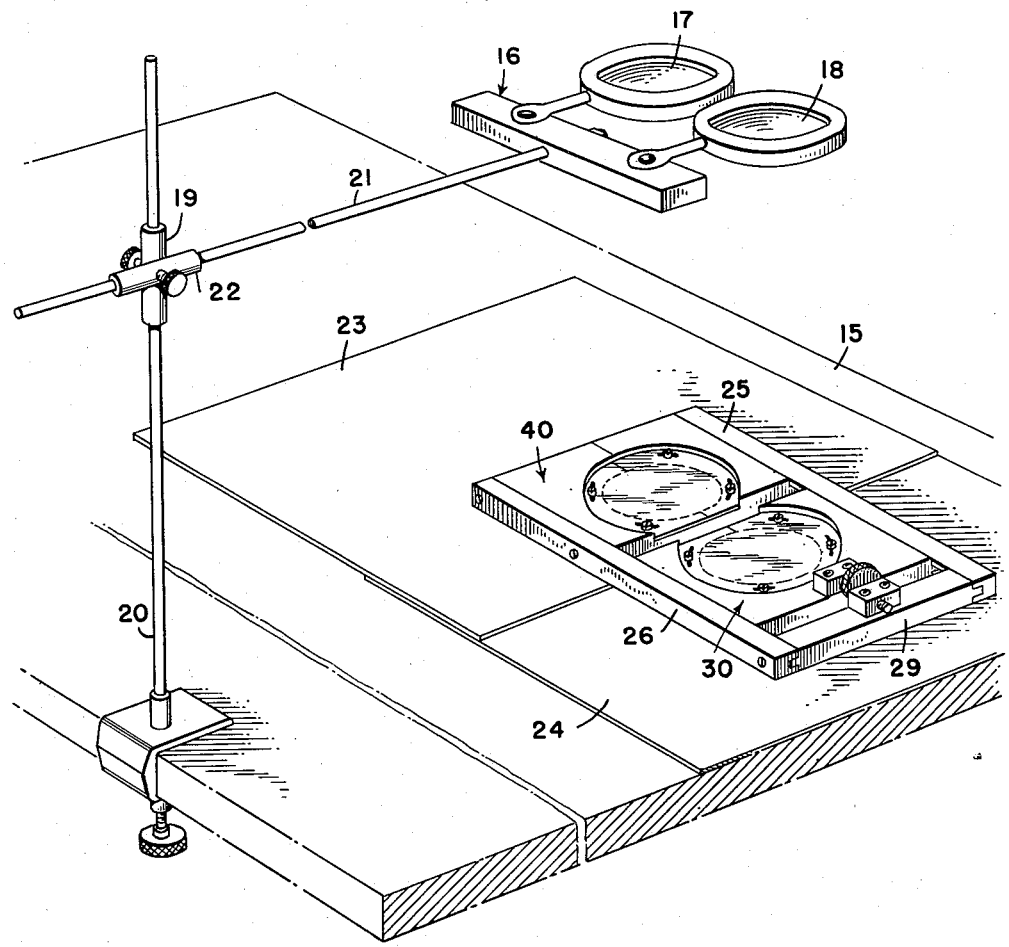
Figure 1 is a three-dimensional view illustrating the instrument in place on a pair of overlap aerial photographs ready to be viewed through a stereoscope to make a slope determination.

In Figure 1, 15 represents a table top having a conventional type stereoscope 16 with lenses 17 and 18, mounted on the table. Vertical and horizontal angular adjustment of the stereoscope relative to the table is made by moving clamp 19 on vertical rod 20 and horizontal adjustment is made by shifting rod 21 in clamp 22. Rod 21 may also be rotated in clamp 22 to bring the lenses parallel to the table top.

Two adjacent overlap aerial photographs 23 and 24 of the land are placed on the table top in proper position so that a photographic stereoscopic image is obtained.

The instrument itself is provided with a frame having side members 25 and 26 provided with parallel U-shaped grooves facing each other, the side members being rigidly secured at one end to an end member 29. A flat bracket 30 is provided with parallel tongues 31 and 32 slidably engaging in the U-shaped grooves. This bracket has a countersunk portion 33 surrounding an aperture 34.

A flat sheet 36 of transparent material is mounted to the bracket in the countersunk portion and aperture as by screws, as indicated at 37, engaging through elongated slots 38, with the bottom of the sheet slightly disposed above the bottom of the bracket to avoid friction when the instrument is moved over the photographs, a set of circles as above described being inscribed on the bottom of the sheet. A flat bracket 40 generally similar to bracket 30 is rigidly mounted on side members 25 and 26, as by screws 41, opposite end member 29. A flat sheet 42 of transparent material similar to sheet 36 is similarly mounted to bracket 40, but rotated 180° relative to sheet 36, with sheets 36 and 42 coplanar.

Bracket 30 is adjustable toward and away from bracket 40 thus to provide for adjustment of the sheets of transparent material toward and away from each other. This adjustment is accomplished by means of an adjusting screw 45 having one end 46 threadedly engaging a lug 47 fixed to end piece 29 and the other end 48 threadedly engaging a lug 49 fixed to bracket 30.

A line, segments 55 and 56 of which are inscribed on sheet 36, and a line, corresponding segments 57 and 58 of which are inscribed on sheet 42, represent the lines along which the centers of the circles are displaced. In mounting the sheets in the brackets, these lines are arranged coincident and parallel to tongues 31 and 32, by aid of the index line 60 on bracket 30 and 61 on bracket 40, so that, regardless of adjustment of the sheet 36 toward or away from sheet 42, the lines remain coincident.

To use the instrument, a pair of adjacent overlap photographs are properly positioned and fastened on the table, and the stereoscope is adjusted to give a clear photographic stereoscopic image, as in the usual procedure. The instrument is then placed on the photographs, as indicated in Figure 1, and oriented to give a clear image corresponding to a dome. In such position, the coincident lines above mentioned will lie parallel to a line joining the centers of the lenses, and a line joining the optical centers of the photographs.

Having selected two points on the photographic stereoscopic image between which the slope is to be determined, the instrument is then moved until a location is found such that a line joining these points extends radially from the apex of the dome image or radially of the circles. By adjusting the distance between the two brackets, the dome image may be raised or lowered relative to the stereoscopic image by means of which and with successive trials of different pairs of circles two of the circles are made simultaneously to lie stereoscopically substantially on these points. The slope will then correspond to that calibrated for or computed from the calibration for the particular circles observed.

In moving the instrument about, it is necessary that the coincident lines before mentioned remain parallel to the line joining the centers of the lenses. This is easily accomplished by observation, since orientation of the instrument from this parallelism results in blurring of the dome image.

In constructing the instrument, the essential requirements relate to inscribing the circles on the transparent sheets, since accuracy of slope determinations depends largely on how well this work is done.

To obtain these circles, it is well to make a drawn plate considerably oversize, and then reduce and transfer it photographically to the transparent sheets. Only one plate need be made, since the sheets are similar except that one is rotated 180° relative to the other when mounted in the instrument.

If an actual dome with circles on it were constructed and photographed by an airplane flying in a straight line directly over it, at an altitude corresponding to that used in taking the overlap photograph of the terrain, two successive snapshots being taken displaced equally from the approach and retreat side of the dome, the resulting photographs would show the desired circles. The problem involved is to make a plate mechanically, which may be photographically transferred to the transparent sheets, to duplicate this.

Figure 5:
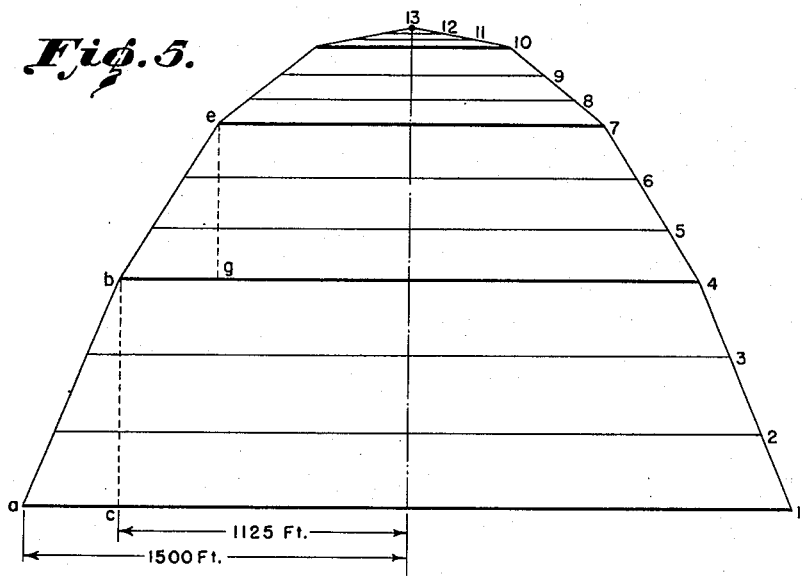
Figure 5 is an elevation of an imaginary dome to illustrate the conic surfaces and for use in explaining the manner of making the inscribed sheets.

Figure 5 illustrates in elevation an imaginary dome. This dome is selected to give a satisfactory instrument for use with aerial photographs taken by an airplane flying at an altitude of 13,750 feet, successive snapshots being taken at intervals of 6000 feet (ground measure) using a camera having a focal length of 8.25 inches, giving a 9 inch by 9 inch exposure with 60% overlap. This is a standard used by the United States Department of Agriculture in making overlap aerial photographs.

In Figure 5, the horizontal scale is 1 foot to .002 inch and the vertical scale 1 foot to .04 inch. Circle 1 at the bottom of the dome has a radius of 1500 feet, circle 4 a radius of 1125 feet, circle 7 a radius of 750 feet, circle 10 a radius of 375 feet, and circle 13 (apex of the dome) a radius of 0 feet. These circles are shown with heavy lines, and they divide the dome into four conic surfaces, the conic frustum between circles 1 and 4 having a 12% slope, that between 4 and 7 an 8% slope, that between 7 and 10 a 4% slope, and the conic surface between 10 and 13 a 1% slope. Intermediate circles 2, 3, 5, 6, 8, 9, 11 and 12, drawn in light lines, divide each of the conic surfaces into three sections. The use of heavy and light lines for the circles renders it easier for the operator to identify the various conic surfaces when observing the dome image.

Using circle 1 as the reference or zero elevation, the elevation of each of the circles is readily computed by simple geometric means. For example, the elevation ($bc$) of circle 4 is found by use of the formula $bc = .12\ ac$, or, in the particular case under consideration, $bc = .12 \times (1500 - 1125) = 45$ feet. Circles 2 and 3 being equally spaced between circles 1 and 2 will have elevations of 15 feet and 30 feet, respectively.

In a corresponding manner, referring to triangle $bge$, $eg$ is readily computed and the elevation of circle 7 is $eg + bc$. As above stated, an imaginary dome of these dimensions is quite satisfactory for use in constructing an instrument to be used with the standard United States Department of Agriculture aerial photography procedure. Variations in slopes of the conic surfaces, number of circles and dimension of the dome may of course be made.

Figure 6:
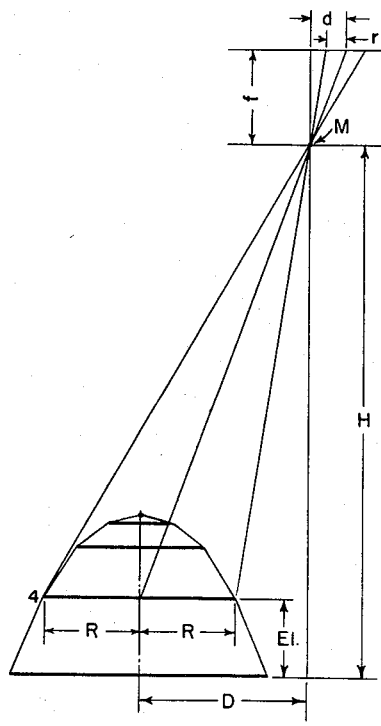
Figure 6 is a geometric representation for further use in explaining the manner of making the sheets.

Referring now to Figure 6, an imaginary dome is shown near the bottom of the figure. Let M represent the lens, P the film and $f$ the focal length of the lens of the camera used in taking the aerial overlap snapshots in an airplane flying at an altitude H above the lower circle 1. (Scale distorted for purpose of illustration.) Let R represent the radius of a circle (such as circle 4) to be plotted and $r$ represent this radius on the film. Let D represent the distance (ground measure) the airplane is beyond the center of the dome, that is, one half the distance traveled by the airplane between the taking of successive snapshots, and $d$ the corresponding distance on the film from the optical center of the film. Let El. represent the elevation of the circle above the circle 1.

Then $$\frac{r}{R} = \frac{f}{(H - \text{El.})}$$

or $$r = \frac{Rf}{(H - \text{El.})}$$

(all dimensions in the same unit).

In the particular case under discussion, $R = 1125 \times 12$ inches (for circle 4), $f = 8.25$ inches, $H = 13750 \times 12$ inches and El. $= 45 \times 12$ inches.

Therefore $$r = \frac{1125 \times 12 \times 8.25}{13705 \times 12} = .6772 \text{ inch}$$

Following the same general procedure, the radii of the other circles are computed.

To find the distance $d$, use $$\frac{d}{D}=\frac{f}{(H-\text{El.})}$$

or $$d=\frac{Df}{(H-\text{El.})}$$

In the particular case under discussion, $D=3000\times12$ inches, and $f$, $H$ and El. have the values as above. Therefore, $$d=\frac{3000\times12\times8.25}{13705\times12}=1.8059 \text{ inches}$$

Following the same general procedure, the $d$'s for the other circle are computed.

In the above equations, the $f$, $H$ and $D$ are constants for all the circles. The $R$ and El. are different for the various circles and are arbitrarily selected, different selection of them giving different slopes to the conic surfaces of the dome image.

Having determined the radii of the several circles and the distance of their centers from the optical center of the film, it is a simple procedure to draw the circles on a plate. For this purpose a line is drawn representing the line of flight of the plane, and a point on this line is arbitrarily selected to represent the optical center of the film.

Figure 2:
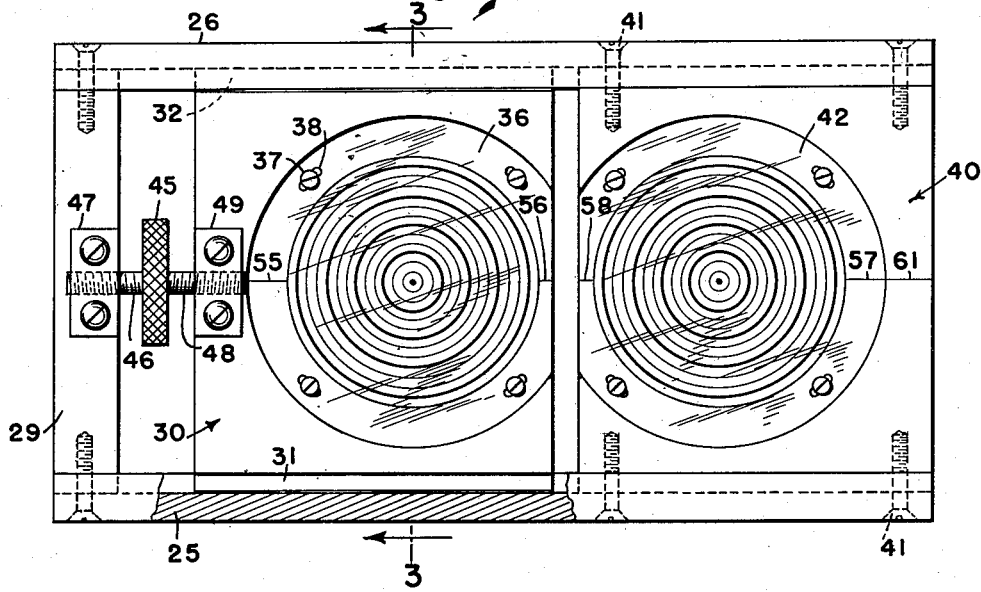
Figure 2 is a top plan view of the instrument with parts broken away.
Figure 3:
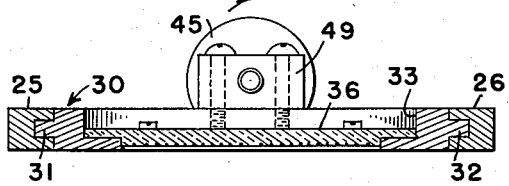
Figure 3 is a section on the line 3—3 of Figure 2.
Figure 4:
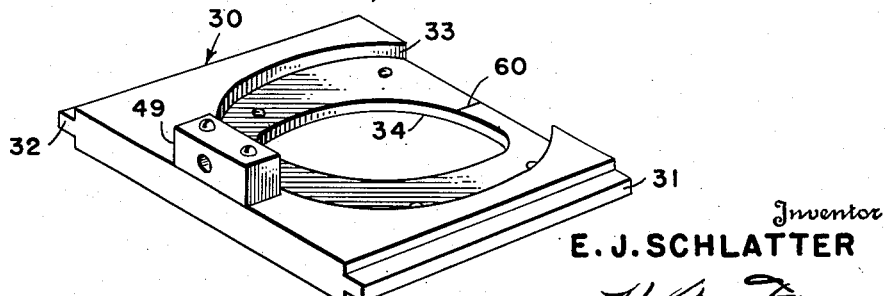
Figure 4 is a three-dimensional view of a detail.

From this point the various $d$'s are laid off on the line and the circles drawn with the proper centers thus located and with the proper radii. As before stated, this plate should be made considerably oversize, as for example, ten times. The line representing the line of flight of the airplane is then removed except for the two segments corresponding to 55 and 56 shown in the transparent sheet 36 in Figure 2. The plate is then ready for transfer with proper reduction to the transparent sheets.

In making a slope determination with the instrument, if two circles belonging to the same conic surface are found to match the two points on the photographic stereoscopic image between which the slope is being determined, the slope between these points will correspond to that calibrated for that particular conic surface, that is, 1%, 4%, 8% or 12% slope. Often, however, the slopes to be determined fall between these values and circles not belonging to the same conic surface must be used. In this event, the slope is computed from the calibration of those circles observed which most nearly contain the points and from the circles falling between them. To do this, the total number of spaces between the circles containing the points is counted. Next the number of spaces utilized in each particular conic surface is counted, this number multiplied by the per cent slope calibration for that conic surface, and the results added for all the conic surfaces involved. This added result is then divided by the total number of spaces between the circles containing the points to give the slope between the points. For closer work, estimated fractional parts of spaces should also be included in this calculation.

With a little practice, an operator, with the particular instrument above described, can set the instrument and make the foregoing calculations mentally, with results which are often not in error by over .5% slope. This order of work is sufficiently accurate for many purposes such as in making road or irrigation or erosion slope determinations. For greater accuracy and wider range, the sheets may have a larger number of circles to give a dome image with more conic surfaces calibrated for more different slopes and more circles on each conic surface. Also, sheets may be prepared with other combinations of circles to suit other flight altitudes, other distances between successive snapshots, and various lens focal lengths. The basic theory and the operating procedures are the same in each case, and the results attained would be comparable to those attained with this instrument, assuming that the photographic quality of the aerial photographs is the same in each case.

Having thus described the invention, what is claimed is:

1. An instrument for measuring land slope comprising a pair of flat, transparent sheets each inscribed with a set of circles, the set of one sheet being similar to that of the other, the circles of each set being of different radii and having their centers displaced along a line, and means for mounting said sheets coplanar with the lines along which the centers are displaced coincident, with the sheets rotated 180° relative to each other and with the sheets adjustable toward and away from each other, the lines along which the centers are displaced remaining coincident during the adjustment, said sheets when viewed through a stereoscope giving an image corresponding to a dome having at least one conic surface the slope of which corresponds to that calibrated for the circles, which dome image, by adjusting the sheets toward and away from each other, may be raised and lowered, whereby the instrument may be placed on a pair of overlap aerial photographs and it and the photographs of the land viewed simultaneously to give a photographic stereoscopic image and the dome image superimposed thereon, and the instrument may be moved and adjusted such that selected points on the stereoscopic image substantially lie on two of the circles along a line extending radially of the circles, the land slope between the points being determined by reference to that calibrated for the circles.

2. The instrument of claim 1 characterized in that the circles are arranged to give an image corresponding to a dome having a plurality of conic surfaces each with a different slope corresponding to that calibrated for the circles on the surface.

3. An instrument for measuring land slope comprising a pair of flat, transparent sheets each inscribed with a set of circles, the set of one sheet being similar to that of the other, the circles of each set being of different radii and having their centers displaced along a line, and means for mounting said sheets coplanar with the lines along which the centers are displaced coincident, with the sheets rotated 180° relative to each other and with the sheets adjustable toward and away from each other, the lines along which the centers are displaced remaining coincident during the adjustment, said sheets when viewed through a stereoscope giving an image corresponding to a dome having conic surfaces the slopes of which correspond to those calibrated for the circles, which dome image, by adjusting the sheets toward and away from each other, may be raised and lowered, whereby the instrument may be placed on a pair of overlap aerial photographs of the land and it and the photographs viewed simultaneously to give a photographic stereoscopic image and the dome image superimposed thereon, and the instrument may be moved and adjusted such that selected points on the stereoscopic image substantially lie on two of the circles along a line extending radially of the circles, the land slope between the points being determined by reference to that calibrated for the circles, the radius of each circle being determined by the equation $$r = \frac{Rf}{(H - \text{El.})}$$

and the displacement of its center along the line being determined by the equation $$d = \frac{Df}{(H - \text{El.})}$$

where $r$ is the radius, $d$ is the displacement of the center from a point on the line, $R$ and El. are different for the various circles and are arbitrarily selected, and $f$, $H$ and $D$ are constants for all circles and represent, respectively, the focal length of the lens used in taking the aerial overlap snapshots, the altitude of the airplane when taking the snapshots, and one-half the distance traveled by the airplane between the taking of successive snapshots.

EUGENE J. SCHLATTER.

REFERENCES CITED

The following references are of record in the file of this patent:

UNITED STATES PATENTS

| Number | Name | Date |
|---|---|---|
| 1,271,907 | Jury | July 9, 1918 |
| 1,592,577 | Stupen et al. | July 13, 1926 |
| 1,816,181 | Eliel | July 28, 1931 |
| 1,894,148 | Barr | Jan. 10, 1933 |
| 2,104,778 | Talley | Jan. 11, 1938 |
| 2,194,582 | Abrams | Mar. 26, 1940 |
| 2,293,416 | Terpening | Aug. 18, 1942 |
| 2,388,858 | MacNeille et al. | Nov. 13, 1945 |
| 2,428,435 | Schlatter | Oct. 7, 1947 |
| 2,477,651 | Ranger | Aug. 2, 1949 |

FOREIGN PATENTS

| Number | Country | Date |
|---|---|---|
| 16,812 | Great Britain | 1906 |
| 298,442 | Germany | Oct. 14, 1919 |

OTHER REFERENCES

"Stereoscopic Photography," by Arthur W. Judge, pages 18, 19, 134, 135 and 172, published by Chapman & Hall, Ltd., 11 Henrietta St., W. C. 2, London, England, 1926.